Patented Oct. 18, 1932

1,883,478

UNITED STATES PATENT OFFICE

HARRY P. BASSETT, OF CYNTHIANA, KENTUCKY

PROCESS OF PURIFYING CELLULOSE MATERIAL

No Drawing.  Application filed June 4, 1929. Serial No. 368,444.

This invention relates to a process of purifying cellulose material.

The principal object of this invention is to provide a process of treating cellulose material such as cotton linters, wood pulp, impure rag stock or any like cellulose material containing oils, resins, ligneous compounds, coloring matter or the like, wherein the impurities are removed without any substantial fixation of the impurities, or derivatives thereof, in or on the cellulose material.

An important object is to provide a practical and economical process of producing cellulose material of a very high degree of heightened purity.

Other objects and advantages of the invention will become apparent during the course of the following description.

As is well known, in numerous branches of the cellulose industry such as in the manufacture of artificial silk, for example, it is customary to subject the cellulose material employed to a preliminary purification treatment to remove oils, resins, coloring matter, ligneous compounds or the like. This preliminary treatment ordinarily consists in digesting the cellulose material under pressure with a boiling solution of a cellulose purifying agent, such as caustic soda, after which the treating solution is drawn off, the cellulose material removed from the digester and the remaining material subsequently washed.

The foregoing procedure although generally practiced, is disadvantageous in that it does not result in the production of a sufficiently pure and white cellulose material for use in certain fields. It has been recognized that in the usual purifying process as outlined above certain impurities which naturally occur in or have been artificially introduced into the cellulose material ordinarily become fixed in and on the cellulose fibers so that it becomes substantially impossible to remove them without considerable injury to the cellulose, if at all. Frequently this deleterious effect is not so pronounced as to deprive the cellulose material of all utility. However, in the production of cellulose of a particularly high degree of purity as when a substantially white product is desired, the effective prevention of the fixing or setting of impurities becomes a problem of major importance, not only when these impurities directly and in themselves discolor the product but also when they promote by chemical or physical action the fixing or setting of foreign substances in and on the material in which they occur.

The exact nature of the physical, chemical, or physiochemical effects which jointly or respectively promote or cause the above referred to fixation of impurities has not been well comprehended or satisfactorily explained and in order to produce a product of a greater degree of purity divers expedients have been resorted to. The processes suggested have met with varying degress of success but none have directly met and overcome the primary difficulty, namely, the premature fixation of foreign substances in and on the material. All of these prior processes of which applicant is aware have been directed merely to the removal of the remaining impurities or discolorants or to the alteration of these substances subsequent to the fixation of the same on the cellulose material.

I have discovered that one of the primary causes of the fixation of impurities as referred to above is the exposure of the freshly digested cellulose material to the action of air. I have also discovered by following the initial digesting of cellulose material with a washing treatment in the absence of air, fixation of the above referred to impurities can be substantially prevented, removal of the impurities can be satisfactorily effected and the cellulose material simultaneously whitened. I have further discovered that cellulose material after being washed while maintaining it out of contact with air can readily be bleached to remove any slight remaining coloration. It will be apparent that by proceeding in accordance with my discoveries it is possible to produce cellulose material of a very high degree of purity and of substantially any desired or predetermined degree of whiteness or bleach.

The cellulose material which is suitable for and subject to treatment by my process hereinafter described includes practically all natural or altered cellulose materials containing digestable or soluble impurities. Notable examples of such materials are wood pulp, cotton linters, rag stock, sulfite pulp and the like.

In the preferred practice of my process the cellulose material to be treated is first digested with a cellulose purifying agent in order to dissolve the impurities present in the cellulose. The digestion may be carried out in any one of a number of well known ways and with any one of the usual purifying agents. Among such agents are caustic soda, sodium acid sulfite and a mixture of sodium sulfide and sodium carbonate. Any one of these or other similar agents may be employed although a relatively weak solution of caustic soda is generally most satisfactory.

As stated above the digestion step may be carried out in any suitable manner. A single boil-out of the material with a solution of caustic soda under pressure in a digester is the usual practice now employed and such practice may be satisfactorily used in connection with the present invention. Since the digestion process per se forms no part of this invention, specific details of procedure are omitted.

The boil-out or digestion process results in the dissolving out of the major portion of the impurities present in the cellulose material but it is obvious that after the treating solution has been drawn off from the material a small amount of the solution and the impurities will remain. This has been recognized heretofore and it has been customary practice to withdraw the partially purified cellulose material from the digester and subject it to a washing process. However, as stated above, the action of air on the partially purified cellulose material prior to the washing step results in the fixing or setting of the remaining impurities, or derivatives thereof, in and on the cellulose fiber, and the removal of the fixed impurities is substantially impossible. Accordingly, I subject the partially purified cellulose material, after the treating solution has been drawn off, to a washing operation without permitting any substantial amount of air to have access to the material until after the washing operation has been completed. I have discovered that by following such practice the remaining treating solution and impurities may be washed out of the cellulose material very readily without any setting or fixation of the impurities in and on the cellulose fiber.

The washing of the partially purified cellulose material may be conducted in a variety of ways, the essential precaution to be taken being that air is prevented from contacting to any substantial degree with the material. While a partial measure of success may be obtained by employing cool or only moderately hot water the greatest measure of success where a cellulose of very high purity and whiteness is desired is obtained by employing relatively hot or boiling water. In the preferred practice of my process the bulk of the digesting or purifying solution is drawn off from the digester and hot water circulated through the digester by means of air-tight conduits. I have found it particularly convenient to force the wash water through the cellulose material by means of a current of steam. Such practice provides a continuous washing operation whereas intermittent or batch treatment must be resorted to where the hot water is introduced into the digester under normal pressure.

If desired, the washing may be effected in a separate receptacle, in which case the digester and the washing receptacle should be connected in such a manner that the cellulose material can be transferred from one container to the other without bringing the material into contact with the air. The connecting means may advantageously consist of an air-tight conduit through which the material is fed, blown, dropped or otherwise transferred from the digester to the washing tank. The washing in the special container may be effected either continuously or intermittently in substantially the same manner as described above where the material is washed in the digester itself.

After the cellulose material has been washed with hot water for a sufficient length of time to remove substantially all of the impurities present, the washed material is then removed from the digester or the separate washing receptacle and is ready for use as desired. The cellulose produced in the manner described above is substantially free from any impurities which have been fixed in or on the cellulose fiber. It is obvious that the resulting product is of such quality as to render its use in preparing cellulose products of superior quality highly advantageous.

While I have described in detail the preferred practice of my process it is to be understood that the details of procedure may be variously modified wtihout departing from the spirit of the invention or the scope of the subjoined claims.

I claim:

1. The herein described process of purifying cellulose material selected from the group comprising wood pulp, cotton linters, and rag stock, without material disintegration thereof, which comprises digesting such material with a solution of a cellulose purifying agent to remove impurities therefrom, and washing the digested material, said material being maintained out of substantial contact with air until after the washing operation.

2. The herein described process of purifying cellulose material selected from the group comprising wood pulp, cotton linters, and rag stock, without material disintegration thereof, which comprises digesting such material with a cellulose purifying agent to dissolve and remove impurities therefrom, removing the purifying solution and dissolved impurities, and washing the digested material, said material being maintained out of substantial contact with air until after the washing operation.

3. The herein described process of purifying cellulose material selected from the group comprising wood pulp, cotton linters, and rag stock, without material disintegration thereof, which comprises digesting such material with a solution of a cellulose purifying agent to dissolve and remove impurities therefrom, drawing off the major portion of said purifying solution and dissolved impurities, and removing the remaining purifying solution and impurities by washing the digested material with relatively hot water, said material being maintained out of contact with air until after said washing operation.

4. The herein described process of purifying cellulose material selected from the group comprising wood pulp, cotton linters, and rag stock, without material disintegration thereof, which comprises digesting such material with a solution of a cellulose purifying agent to remove impurities therefrom, and washing the digested material with relatively hot water, said material being maintained out of contact with air until after the completion of said washing operation.

In testimony whereof I affix my signature.

HARRY P. BASSETT.